US010673689B2

(12) United States Patent
Abdulghani et al.

(10) Patent No.: US 10,673,689 B2
(45) Date of Patent: Jun. 2, 2020

(54) SYSTEM AND METHOD FOR MANAGING ALERTS USING A STATE MACHINE

(71) Applicant: NetScout Systems, Inc, Westford, MA (US)

(72) Inventors: Amin Arshad Abdulghani, Piscataway, NJ (US); Chris Yongxing Liu, Acton, MA (US); Sushma Sharma, San Jose, CA (US)

(73) Assignee: NetScout Systems, Inc, Westford, MA (US)

( * ) Notice: Subject to any disclaimer, the term of this patent is extended or adjusted under 35 U.S.C. 154(b) by 256 days.

(21) Appl. No.: 15/716,044

(22) Filed: Sep. 26, 2017

(65) Prior Publication Data

US 2019/0097876 A1 Mar. 28, 2019

(51) Int. Cl.
*H04L 12/24* (2006.01)
*H04L 29/06* (2006.01)
*G06F 11/32* (2006.01)

(52) U.S. Cl.
CPC .......... *H04L 41/0681* (2013.01); *H04L 41/22* (2013.01); *H04L 41/5048* (2013.01); *H04L 63/1425* (2013.01); *G06F 11/327* (2013.01); *H04L 41/0686* (2013.01)

(58) Field of Classification Search
CPC ..... H04L 41/0213–065; H04L 63/1408–1458; H04L 63/1425; H04L 41/0681; G06F 11/0739–781; G06F 11/328; G06F 11/52–566; G06F 11/327; H04W 4/38
See application file for complete search history.

(56) References Cited

U.S. PATENT DOCUMENTS

| 9,467,460 | B1* | 10/2016 | Otvagin | G06F 16/13 |
| 2002/0120886 | A1* | 8/2002 | Nguyen | G06F 11/328 714/39 |
| 2004/0098617 | A1 | 5/2004 | Sekar | |
| 2009/0044050 | A1* | 2/2009 | Maimone | G06F 11/0739 714/15 |
| 2012/0137367 | A1 | 5/2012 | Dupont et al. | |
| 2013/0227714 | A1* | 8/2013 | Gula | H04L 63/0876 726/32 |
| 2018/0019876 | A1* | 1/2018 | Moss | G06F 21/64 |

OTHER PUBLICATIONS

Extended European Search Report for European Patent Application EP18196775.3, dated Jan. 25, 2019.

* cited by examiner

*Primary Examiner* — Hitesh Patel
(74) *Attorney, Agent, or Firm* — Locke Lord LLP; Scott D. Wofsy; Christopher J. Capelli

(57) ABSTRACT

A system and computer-implemented method to manage alerts, wherein the method includes receiving anomaly triggers associated with detected anomalies, associating an anomaly trigger of the received anomaly triggers with an alert, tracking the alert using a state machine, determining whether to change a state of the state machine if a subsequent anomaly trigger associated with the alert is received or if a predetermined amount of time passes without receiving trigger information, and generating an alarm based on the state of the state machine.

18 Claims, 11 Drawing Sheets

| Application Service: New Service 1  272 | | | |
|---|---|---|---|
| Service Name: New Service 1 ▼ Monitor: Universal ▼ | | | |
| ☑ Alerts 278 | | | |
| Profile: Service Profile 1 ▼ ⊕⊘⊖⊡Ċ ☐ Action: ⊕⊘⊖⊡Ċ | | | |
| Configure services by adding or deleting service members. At least one service member is required. | | | |
| 276a 276b 276c 276d | | | |
| Application | Transport | Interface | Location |
| POP3_SSL | TCP | lSp73_55:if3 | |
| POP3 | TCP | lSp73_55:if3 | |
| DIAMETER-SCTP:CreditCtrl | SCTP | lSp73_53:if3 | |
| Netflix | TCP | lSp73_55:if3 | VLAN-504 |
| HTTPS | TCP | lSp73_167:if3 | |
| Oracle | TCP | lSp73_55:if3 | VLAN-0 |
| HTTPS | TCP | lSp73_167:if3 | |
| SNMPTRAP | UDP | lSp73_53:if3 | |
| Yandex | TCP | lSp73_53:if3 | |
| HTTPS | TCP | lSp73_167:if3 | VLAN-1 |
| HTTPS | TCP | lSp73_167:if3 | VLAN-2165 |
| IMAP | TCP | lSp73_55:if4 | |

Total: 12

*Fig. 2A*

| Application Profile: Service Profile 1 | |
|---|---|
| Configure a new alert profile or modify the selected alert profile. | |
| Name: [Service Profile 1] ☑ Trigger alerts on aggregated service members | |

Triggers

| Metric Type | Alert Type | Anomaly & Severity Condition |
|---|---|---|
| % Timeout | Baseline | Increasing; Warning: 1; Critical: 40; Delta Suppression: 20%; Minimum = of Transaction: 100; Trigger after: 1 (5-minute samples) |
| Avg Response Time | Threshold | Increasing; Minimum Successful transactions; 100; Trigger after: 1 (5-minute samples) |
| Transaction Rate | Threshold | Increasing; Warning: 10,000; Critical: 25,000; Trigger after:1 (5-minute samples) |
| % Utilization | Baseline | Increasing; Warning: 70; Critical: 90; Delta Suppression; 40%; Trigger after: 1 (5-minute samples) |

*Fig. 2B*

| Rule No. | Actor | From | To | Preconditions | Action to Hash Table | Action to Database |
|---|---|---|---|---|---|---|
| 1 | New Trigger | Initial | PreActive | Delta=0 AND pollInterval>1 sample AND ignoreSeverity | Add new entry with PREACTIVE state. | Add new entry in Event table. |
| 2 | New Trigger | Initial | Active | Delta=0 AND pollInterval=1 sample AND ignoreSeverity | Add new Entry with ACTIVE state. | Generate new alarm and add new entry in Traps table. Add new entry in Event table. |
| 3 | New Trigger | PreActive | PreActive | Delta<pollInterval AND ignore Severity | Update lastupdate time to currentTimeStamp. | Update existing entry in Events table. Set lastupdateTime to currentTimeStamp. Update alert evidence. |
| 4 | New Trigger | PreActive | PreActive | Gap>1 sample AND ignoreSeverity | Update lastupdate time and triggertime to currentTimeStamp. Reset evidence. | Update the existing entry in Event table. Set lastupdateTime and triggerTime to currentTimeStamp. Update alert evidence. |
| 5 | New Trigger | PreActive | Active | Delta> pollInterval AND ignoreSeverity | Update lastupdate time to currentTimeStamp. Update evidence. | Generate new alarm and add new entry in Traps table. Update existing entry in Event table. Set lastupdateTime and triggerTime to currentTimeStamp. Update alert evidence. |

Fig. 4A

| Rule No. | Actor | From | To | Preconditions | Action to Hash Table | Action to Database |
|---|---|---|---|---|---|---|
| 8 | New Trigger | Active | Active | Delta<maxDuration AND Gap<maxAlarmWaitTime | Look for additional existing matches that are not INACTIVE, EXPIRED OR ALLDONE state. If no match found, then add new entry with ACTIVE state. | If new entry added in cache, generate new alarm and insert new entry in Traps table. Add new entry in Event table. |
| 9 | New Trigger/ Periodic Scheduler | Active | Expired | Delta>maxDuration AND Gap<maxAlarmWaitTime | Add new Entry with ACTIVE state. | Generate new alarm and add new entry in Traps table. Add new entry in Event table. |
| 10 | New Trigger/ Periodic Scheduler | Active | InActive | Gap>=maxAlarmWaitTime | Add new Entry with PREACTIVE state. | Add new entry in Event table. |
| 11 | Purging Scheduler | Expired | AllDone | Purging thread scheduled | Generate cleartrap if needed. | Update the existing entry in Event table. Update alert evidence (State to ALLDONE, clearTrap sent). |
| 12 | Purging Scheduler | InActive | AllDone | Purging thread scheduled | Generate cleartrap if needed. | Update the existing entry in Event table. Update alert evidence (State to ALLDONE, clearTrap sent). |

*Fig. 4C*

SYSTEM AND METHOD FOR MANAGING ALERTS USING A STATE MACHINE

FIELD OF THE INVENTION

The present technology relates to network monitoring and, more particularly, methods and systems to manage an alert using a state machine.

BACKGROUND OF THE INVENTION

Computer systems and computer network systems are monitored for anomalies. When an anomaly occurs, an alarm can be generated to notify a user or administrator. The types of anomalies that are of interest for the purposes of generating alarms can vary based on how a system is configured or used. Furthermore, it is well known that overuse of alarms can become a nuisance and/or cause alarm recipients to ignore such alarms. Customization of alarms can help administrators configure a system to generate alarms based on the needs of the system and its users. One such customization allows an administrator to apply a filter to a large set of available alarms, yet such customization is limited and cumbersome. Furthermore, although detection of a condition that can trigger an alarm can provide valuable information, even if the alarm is not triggered, such information may not be available or may be difficult to find or access. Additionally, there can be a high false-positive rate for alarms generated, coupled with difficulties determining a cause for a false-positive alarm signal that was generated.

Such conventional methods and systems have generally been considered satisfactory for their intended purpose. However, there is still a need in the art for a method to manage the generation of alarms that allows users to change configuration, to control triggering of alarms, to gather alarms and make them accessible and to manage information for detected conditions that did not trigger an alarm in a straightforward manner.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method to manage alerts, wherein the method includes receiving anomaly triggers associated with detected anomalies, associating an anomaly trigger of the received anomaly triggers with an alert, tracking the alert using a state machine, determining whether to change a state of the state machine if a subsequent anomaly trigger associated with the alert is received or if a predetermined amount of time passes without receiving trigger information, and generating an alarm based on the state of the state machine.

In accordance with another aspect of the disclosure, an analysis system is provided to manage alerts. The system includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

The accompanying appendices and/or drawings illustrate various non-limiting, example, inventive aspects in accordance with the present disclosure:

FIG. 2A illustrates an example service screen shot of a graphical user interface (GUI) for entering, accessing, or editing service definition information stored in a service/alert profile data structure of the network monitoring system shown in FIG. 1;

FIG. 2B illustrates an example alert profile screen shot of a GUI for entering, accessing, or editing alert profile information stored in the service/alert profile data structure of the network monitoring system shown in FIG. 1;

FIGS. 4A-4C illustrate a transition rules table that describes application of example transition rules by a transition module of the analysis system shown in FIG. 2;

DETAILED DESCRIPTION OF CERTAIN EMBODIMENTS

Figure 1:
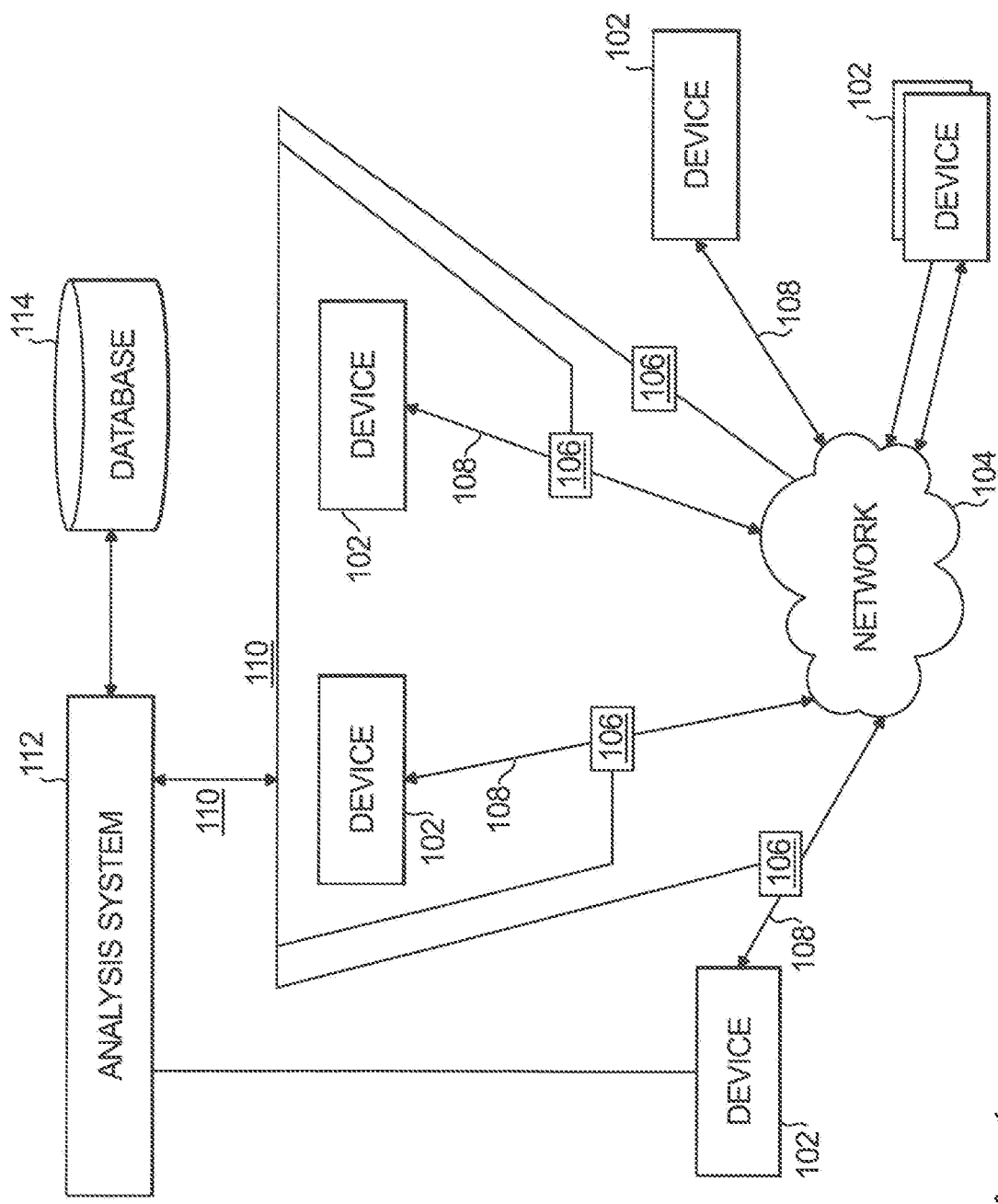
FIG. 1 illustrates a block diagram of an example network monitoring system, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network monitoring system in accordance with the disclosure is shown in FIG. 1 and is designated generally by reference character 100. Other embodiments of the network monitoring system 100 in accordance with the disclosure, or aspects thereof, are provided in FIGS. 2-7, as will be described.

A network monitoring system is provided that detects anomalies. When a new anomaly is detected, the network monitoring system establishes a finite state machine, and by applying transition rules, tracks an alert associated with the anomaly using the state machine and generates an alarm, under certain conditions, to notify users or administrators of an alarm condition associated with the anomaly. An alert or alert condition is related to a condition that is recognized for purposes of tracking, whereas an alarm or alarm condition is related to a determination that a tracked alert satisfies particular requirements defined by an alert profile that warrant notification to a user or system. An administrator can configure conditions that define an anomaly as well as parameters of the transition rules.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network monitoring system 100 includes a plurality of devices, referred to collectively as devices 102, which are coupled to a network 104 via data links 108. These data links 108 can be wireless links, wired links, or a combination thereof. The devices 102 include, for example, subscriber end devices, network nodes, application servers, and external devices. A plurality of intercept devices 106 intercept live packets transmitted between devices 102. An analysis system 112 is coupled to the intercept devices 106 to process data output by the intercept devices 106 that is associated with a specific service. The term "live packet," as used herein, means that the packet is included in an actual stream of end-to-end network traffic and is en route between end devices.

The devices 102 can communicate with other devices 102 that are coupled to the same network or a different network via the network 104. The network 104 can be, for example, a network such as the Internet, a private network, a different public network, a cellular network, a personal communication service (PCS) network, a public switched telephone network (PSTN), a wired network, a wireless network, etc. Network traffic can be transmitted between devices of the network 104 and/or between devices of the network 104 and devices of an external network (not shown) via network 104.

The devices 102 can include, for example, mobile computing devices, smart phones, servers, media servers, application servers, stationary computing devices, printers or multi-functions devices, sensors, consumer devices, external devices, and network devices, such as routers, switches, hubs, and bridges that are used to communicatively couple devices 102 to one another.

Network devices can be network nodes that facilitate data communication through the network 104 by handling network data, such as for routing traffic through the network 104 and/or performing security or monitoring operations associated with the network traffic. External devices can include network nodes or end devices associated with another network that can communicate with other devices 102 via network 104. The external devices can be network devices, application servers, or user end devices, wherein the end devices may not be monitored by intercept devices 106.

The external devices may not be coupled to network 104, and the monitoring of the external device and analysis of monitored device can be performed without network 104, such as locally using wired or near frequency connections (NFC). In embodiments, the monitoring and/or analysis can be performed remotely, such as via a public network, such as the Internet.

Application servers can include servers that provide a service to subscriber end devices (e.g., mobile computing devices, smart phones, stationary computing devices, printers or multi-functions devices, sensors, consumer devices), which can be associated with individuals or other servers. While the communications to and from the application servers can be monitored, the disclosure is directed to processing information obtained from monitoring the subscriber end devices rather than information obtained from monitoring the application servers. Examples of application servers include media servers for providing a media service (e.g., streaming video or audio); voice over internet servers for providing voice over internet services; data analysis servers for collecting and analyzing data from e.g., sensors; configuration servers for re-configuring an end device; transaction servers for processing a transaction. Examples of such transactions include, for example and without limitation, retail purchases, banking transactions, and securities transactions.

One or more packet intercept devices 106 are provided that can be distributed about the network 104 to intercept packets flowing at various locations of the network 104 and generate corresponding flow summaries that summarize intercepted data. The intercept devices 106 are disposed at locations along the data links 108 and/or disposed at or integrated with devices 102 for accessing a live packet stream transmitted between end devices.

In embodiments, one or more aggregation devices (not shown) can aggregate data, such as flow summaries, output by one or more intercept devices 106 and provide the aggregated data to the analysis system 112. The term "provide" as used in the context of providing data refers to transmitting, making available to be retrieved, writing, sending, or otherwise providing. In embodiments, and described below without limitation to the specific embodiment, the analysis system 112 performs the aggregation of flow summaries collected by the intercept devices 106.

The intercept devices 106 can continuously monitor network traffic flows, each flow corresponding to a conversation between devices 102 over the network 104, and output flow summaries at time intervals based upon a configurable poll interval. For example, the time interval can be five minutes, without limitation to a particular time interval. A flow summary record includes a summary of the data and measurements for different metric types observed by the intercept devices 106 for a given flow (or related flows, e.g., flows seen for a given app and a client-server pair) within the time interval. The intercept devices 106 can include hardware, firmware, and/or software components that are configured to monitor network traffic, wherein monitoring can include, for example, measuring, intercepting, capturing, copying, or inspecting a network traffic packet, flow, or stream. Intercept devices 106 can include central or distributed elements for performing tasks associated with the monitoring. The intercept devices 106 can be passive or active and include, for example, distributed or centralized network devices, such as routers, switches, taps, port mirrors, and probes, that acquire and/or collect flow summaries. These elements can be positioned inline and/or remote relative to devices 102 and communication links 108. In embodiments, one or more intercept devices 106 can be integrated with an aggregation device.

In embodiments, the intercept devices 106 and aggregation devices can include software modules, which can include software agents. In embodiments, the intercept devices 106 and aggregation devices can be physical or virtual devices that are physically remote relative to devices 102 and the data links 108. Whether as a physical or virtual device, the intercept devices 106 and aggregation devices use firmware or a hardware processing device that executes software instructions, which enables performance of the disclosed functions.

The intercept devices 106 and aggregation devices can be located remotely from one another and can further be located remotely from the analysis system 112. Data output by the intercept devices 106 about the intercepted packets is transmitted to the analysis system 112 via one or more data paths 110. Data paths 110 can include a bus and/or communication links, where the communication links of data paths 110 can be wireless, wired, or a combination thereof. In embodiments, data paths 110 can be included in a network.

Interception of a packet by an intercept device 106 refers to accessing the packet, such as to enable inspecting contents of the entire packet or portions of the packet. The intercept device 106 can make a copy of the packet or portions thereof, or store the packet or portions thereof. Additionally, the intercept device 106 can inspect the live packets. This inspection can be performed at the location at which the live packets were intercepted. Alternatively, the inspection can be performed by the aggregation device or the analysis system 112. The inspection of the packets can include deep packet inspection, including inspection of contents of at least one of a header and footer of the packet. Inspection includes accessing and reading the contents so that the contents can be processed. When inspection indicates that the contents of the packet are encrypted, the intercept device 106, aggregation device, or analysis system 112 can decrypt encrypted portions of the contents.

The aggregation devices can be positioned at the location of an intercept device 106 or at a different location. In embodiments, an aggregation device is integrated with the analysis device 112 as an aggregation module. The analysis system 112 processes intercept data output by the intercept devices 106 (and/or aggregation data output by aggregation devices, if provided), such as to detect and analyze anomalies.

Each of the intercept devices 106 and the analysis system 112 may be a special purpose computing device or a software component (not limited to a single process or on a single server) dedicated to its corresponding functions related to monitoring data communicated via the network 104. For example, the intercept devices 106 and the analysis system 112 can execute object oriented programs that define classes, which are non-modifiable once defined, thus forming a virtual machine. Objects are executed as instances of a class. The objects can be interactive objects that include attributes with quantifiable values and functions that are invoked by values. The values can be received as input or from other objects. Alternatively, each of intercept devices 106 and analysis system 112 may be a general purpose computing device with specialized software components installed thereon. In one embodiment, the intercept devices 106 are embodied as nGenius Probes, nGenius InfiniStream, or InfiniStream Next generation probes collectively called ISNG probes available from NetScout Systems, Inc. of Westford, Mass. In embodiments the analysis system 112 is a computing device running NetScout nGeniusONE or Netscout nGenius Business Analytics (nBA) application software, available from NetScout Systems, Inc. of Westford, Mass.

Figure 2:
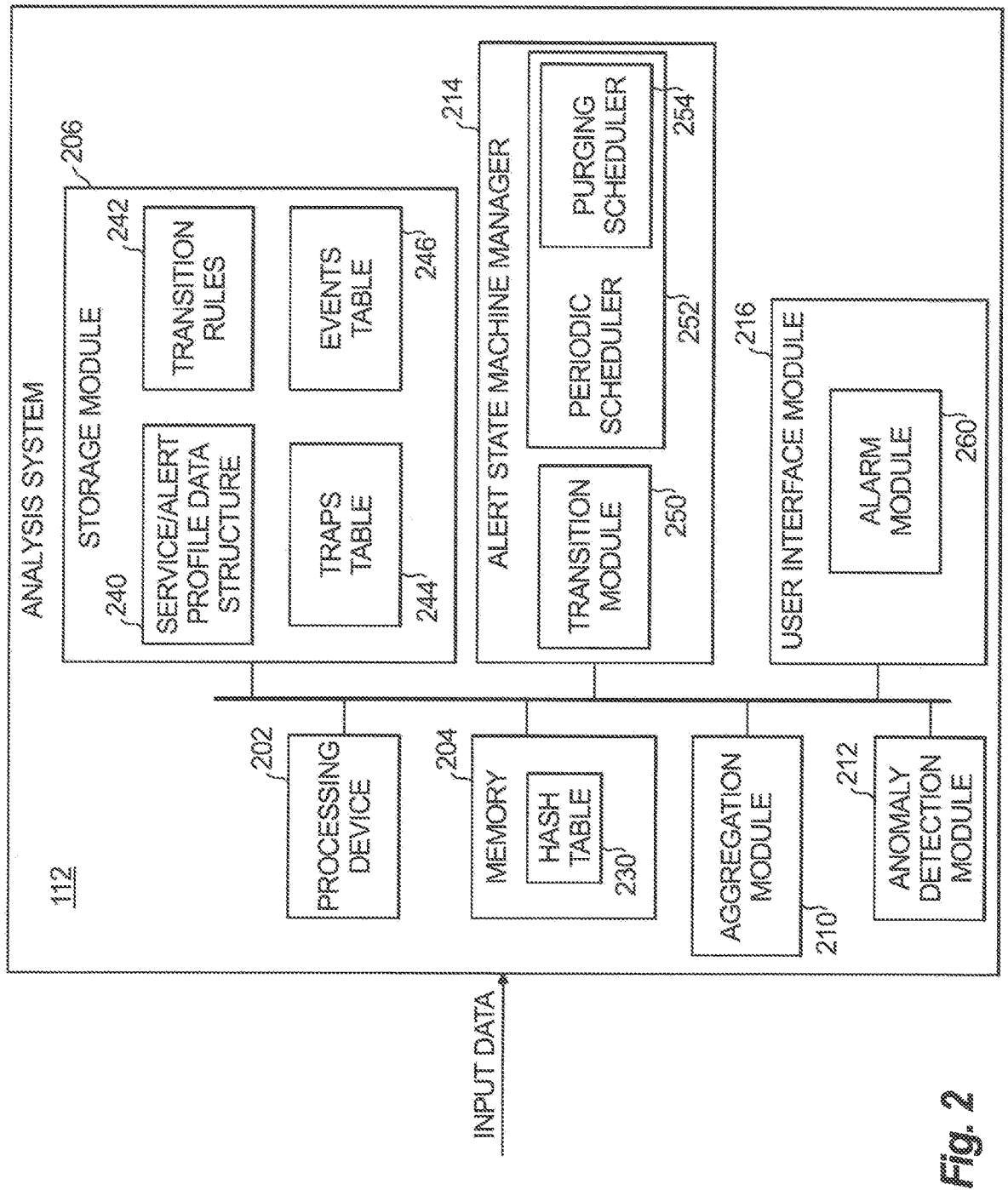
FIG. 2 illustrates an example analysis system of the network monitoring system shown in FIG. 1.

FIG. 2 shows a block diagram of an example analysis system 112, which in the example shown includes a processing device 202, a memory 204, a storage module 206, an aggregation module 210, an anomaly detection module 212, a state machine manager 214, and a user interface module 216. The analysis system 112 can receive input data from a user via user interface module 216, an analog device, or another digital processing device. The input data includes, for example, service member definitions, service definitions, and alert profiles. The service member definitions, service definitions, and alert profiles can be predefined or provided/updated by user input. The analysis system 112 further receives flow summaries from intercept devices, such as intercept devices 106 shown in FIG. 1. The flow summaries represent actual measurements of identified network parameters that are measured by and received from the intercept devices. The processing device 202 executes software instructions such as included in modules of the analysis system 112, such as the aggregation module 210, anomaly detection module 212, state machine manager 214, and user interface module 216, including engines or modules included therein.

The processing device 202 can include, for example, a field-programmable gate array (FPGA), application specific integrated circuit (ASIC), microcontroller, microprocessor, or the like. The processing device 202 can include firmware and/or hardware for executing software modules configured to perform the operations in accordance with the disclosure.

The memory 204 is a short term memory, such as volatile memory for temporary storage and quick access. Memory 122 can include random access memory (RAM), such as static RAM (SRAM) and/or dynamic RAM (DRAM), or the like. Memory 204 stores a hash table 230, shown in FIG. 3. The hash table 230 includes a plurality of state machine entries (also referred to as state machines) that represent state machines and track the state of an alert associated with a detected anomaly. The hash table state machine entries are shown and described in greater detail in FIG. 3 and the associated description. The storage module 206 includes nonvolatile long term storage that stores a service/alert profile data structure 240, transition rules 242, a traps table 244, and an event table 246.

The service/alert profile data structure 240 is a data structure that can include one or more tables or the like that defines the relationship between service members, services, and alert profiles. A service is a collection of service members, each service having at least one member. Each service member is associated with a key that includes a combination of defining properties.

Alert tracking is triggered based on keys. The keys can include properties such as a metric type, an interface, a site (e.g., branch office), virtual local area network (VLAN), access point name (APN), and/or an application ("app"). The interface can identify the interface and its location at which the intercept device 106 intercepted the intercept data, the site can identify a group of related network servers or clients that are in a same region or same subnet that are being monitored, and the application can identify the application associated with the intercept data. The metric type identifies the characteristic that is measured, for example, bitrate or utilization.

FIG. 2A shows an example service screen shot 270 of a graphical user interface (GUI) for entering, accessing, or editing service definition information stored in the service/alert profile data structure 240 that defines services and service members. The service screen shot 270 indicates a service field 272, service member entries 274, and key data 276a-276d (referred to collectively as key data 276) for each service member entry 274, and an alert profile field 278.

In the example shown, the service field 272 indicates a service that is accessed, which is identified as "New Service—1". The service screen shot 270 shows key category fields 276, with key data entered in the key category fields 276 for twelve service member entries 274. For each service member entry 274, the combination of key data in the different key category fields 276 forms a key. The key category fields 276 are illustrated to include an application field 276a, a transport field 276b, an interface field 276c, and a location field 276d. Other examples of key category fields 276, without limitation, could include site, VLAN, or APN fields. Alert profile field 278 identifies the alert profile associated with the service identified in the service field 272.

FIG. 2B shows an example alert profile screen shot 290 of a GUI for entering, accessing, or editing alert profile information stored in the service/alert profile data structure 240 that defines alert profiles. The alert profile defines one or more triggers for a specific type of metric, each trigger defining a condition when an anomaly is generated and a condition for assigning severity. The defined trigger is applied to determine whether an anomaly has been detected.

In the example shown, the alert profile screen shot 290 includes an alert identification field 292, an alert application field 293, a metric type field 294, an alert type field 296, and a conditions and severity field 298. An alert profile "Service Profile 1" is identified in the alert identification field 292. A check entered in the alert application field 293 indicates that the alert profile is applied to the service as a whole. When the entry is not checked, the profile is applied to the service members in the associated service individually. Accordingly, the alert profile can be associated to one or more of the service members included in the service to which the alert profile is associated.

Each alert profile includes at least one metric type that is identified in metric type field 294. The metric type can be, for example, timeout percentage, bit rate, failure rate, retransmission percentage, jitter rate, packet loss percentage, average response time, transaction rate, utilization percentage, etc. An alert type identified in alert type field 296 and anomaly and severity conditions identified in anomaly and severity conditions field 298 are associated with each metric type. The alert type can be, for example, baseline or threshold. The anomaly and severity conditions can be based on, for example, number of poll intervals required (poll interval rules), rules for determining severity (also referred to as severity rules), timeout rules (e.g., maximum alert wait time, maximum duration), and metric threshold or relative baseline cutoff values for one or more identified metric types.

The transition rules 242 are logical rules that process anomaly triggers and requests from a periodic scheduler 252 to generate and update the state machines, store data about the state machines in the traps table 244 and the event table 246 in long term memory, and generate alarms. Example transition rules 242 are illustrated and described in a transition rules table shown in FIGS. 4A-4C. The traps table 244 stores alarms that have been generated, and the event table 246 stores and persists the state of entries that correspond to the state machines in the hash table 230.

The aggregation module 210 aggregates intercept summaries received by the analysis system 112 from the intercept devices, based on, for example, service member keys and a metric type that applies to the service member's associated alert profile. The intercept summaries that are received can be stored in a database, such as database 114 shown in FIG. 1, and accessed by the aggregation module 210 to perform aggregation. The intercept summaries further include actual measurement data for the metric type upon which the aggregation is based. A timestamp is associated to the aggregated data, wherein the timestamp is obtained from the timestamp(s) associated with the aggregated flow summaries. Accordingly, aggregated data includes a key, a metric type, actual measurement data, and a timestamp.

The anomaly detection module 212 processes the aggregated data, using the aggregated data's key, metric type, actual measurement data and possibly timestamp, to detect an anomaly and generate an anomaly trigger if an anomaly is detected. The detection of an anomaly and characterization of the anomaly severity is based on a comparison of the actual measurement data anomaly and severity conditions included in the alert profile associated with the service member having the same key as the aggregated data.

Operation of the anomaly detection module 212 is now described in greater detail. The anomaly detection module 212 accesses the service member (or if applicable the whole service) in the service/alert profile data structure 240 that has a key that matches the key of the aggregated data. The anomaly detection module 212 further accesses the alert profile that is associated with the service member. In the alert profile, the anomaly detection module 212 determines the metric type that corresponds to the metric type of the aggregated data. The anomaly detection module 212 accesses the anomaly and severity conditions and alert type associated with the determined metric type. The anomaly detection module 212 determines if an anomaly is detected by applying the rules (e.g., poll interval rules, severity rules, timeout rules, without limitation) in the accessed anomaly and severity conditions (using the accessed alert type) to the actual measurements and possibly timestamps of the aggregated data.

Regarding alert type, for a threshold alert type, a threshold test is applied that compares the actual measurements for an identified network parameter to a specified metric value provided in the anomaly and severity conditions, wherein the metric value is applied as a threshold. For a baseline alert type, a baseline test is applied that compares the actual measurements for an identified network parameter to a specified metric value, wherein the metric value is computed from the historical baseline. When the threshold or baseline is exceeded or below (depending on which test is applied), a test counter is incremented. The test counter can be stored in memory 204.

The poll interval rules define criteria associated with the test counter for determining that an anomaly has been detected or that an associated state machine can transition to or remain in an active state. The criteria defined by the poll interval rules can be, for example, a count of polled samples required to exceed the test defined by the alert type for determining that an anomaly has been detected, and whether the polled samples counted need to be consecutive or within a predefined interval (e.g., a predetermined number of polls or a predetermined time interval).

The anomaly detection engine 212 applies the severity rules to determine the severity of a detected anomaly. The severity rules can, for example, use a number of times the test counter is incremented within a poll or time interval, whether the poll intervals are consecutive, the amount by which a threshold or baseline is determined to be exceeded, etc. The timeout rules define when the test counter should be reset to zero, such as after a certain time interval or number of polls and/or whether poll intervals are consecutive. For example, the maximum duration (maxDuration) can specify a number of intervals the associated state machine can remain in an active state, and the maximum alert wait time (maxAlarmWaitTime) can specify a number of intervals the associated state machine can stay in an active or preactive state while not receiving any new anomaly triggers.

The anomaly detection engine 212, upon generating an anomaly trigger, notifies the state machine manager 214 to update the hash table 230. Updating the hash table 230 can include searching the hash table 230 for an existing state machine represented by a matching hash table entry that corresponds to the detected anomaly. A matching hash table entry would have a key that matches a key and metric type of the associated aggregated data. If the state machine (i.e., its corresponding hash table entry) is found, the state machine is updated with the timestamp of the anomaly trigger. Additionally, a state field in the hash table entry is updated by the state machine manager 214, e.g., based on transition rules.

If such a state machine is not found, the state machine manager 214 can add a new state machine as an entry to the hash table 230, with the state machine's trigger time set equal to the timestamp of the anomaly trigger. The hash table entry is assigned a hash key that corresponds to the aggregated data's key and metric type. Also stored with the hash table entry are the actual measurements and timestamp of the aggregated data and alert profile parameters from the service/alert profile data structure 240, namely at least a portion of the alert type and anomaly and severity conditions of the alert profile that is associated with the aggregated data. The state machine manager 214 can determine an initial state of the new hash table entry.

The state machine manager 214 includes a transition module 250 and a periodic scheduler 252. The periodic scheduler 252 can include a purging scheduler 254, the function of which is described further below in relation to Rules 11 and 12 shown in FIG. 4C. The transition module 250 processes the anomaly triggers by applying the transition rules 242, which includes updating the hash table 230, traps table 244, and event table 246 and generating alarms. In embodiments, the user interface module 216 queries the traps table 244, such as in response to a user input via the user interface module, satisfaction of a condition, or at regular time intervals. In embodiments, generation of an alarm includes notifying the user interface module to output an alarm.

The user interface module 216 can includes an alarm module that, when an alarm is generated, outputs an alarm by interfacing with user output devices, such as a display monitor, audio speakers, and/or a printer. Additionally, the user interface module 216 can receive user input data by interfacing with user input devices, such as a keyboard, pointing device (e.g., mouse), touch screen, etc. Thus, the user interface module 216 provides an interface for exchanging data between a user and the analysis system 112.

Figure 3:
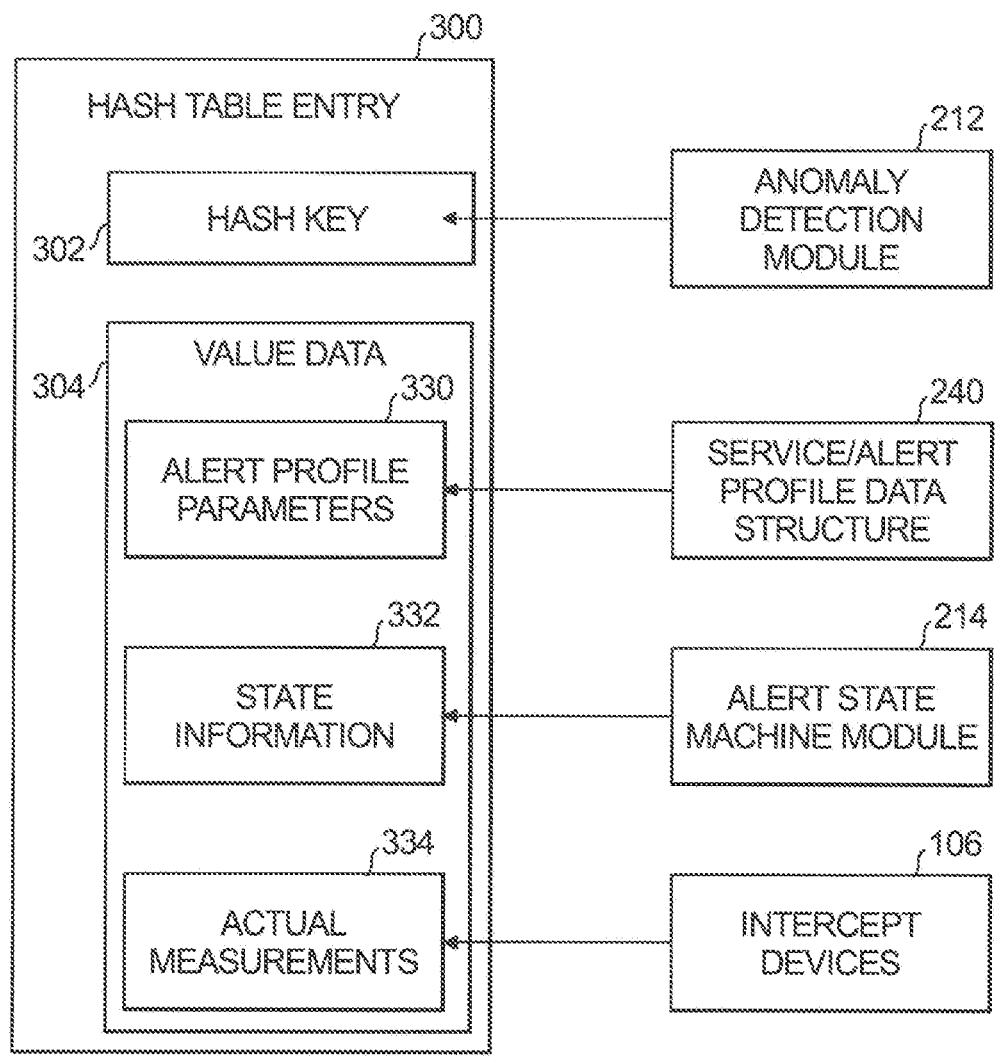
FIG. 3 illustrates an example hash table of the analysis system shown in FIG. 1.

FIG. 3 shows an example hash table entry state machine 300, which is an example of an entry of a plurality of entries included in a hash table, such as hash table 230. Each state machine 300 corresponds to an anomaly trigger and includes a hash key 302 and value data 304. The state machine 300 is established by creating an entry in the hash table that includes the hash key 302 and value data 304 that corresponds to the anomaly trigger for which the state machine 300 is being established. Establishment of the state machine 300 indicates that an alert is established and is tracked through various states. The hash key 302 of the state machine 300 can include the aggregated data's key and a metric type from an alert profile that is associated with a service member having the same key. The hash key 302 can be determined using the anomaly detection module 212.

The value data 304 includes, for example, alert profile parameters 330, state information 332, and actual measurements 334. The alert profile parameters 330 include, for example, at least a portion of the alert type and anomaly and severity conditions of the alert profile that is associated with the aggregated data, such as anomaly and severity conditions (e.g., poll interval rules, severity rules, timeout rules), alert type, and metric values. The alert profile parameters 330 are obtained from the alert profile stored in the service/alert profile data structure 240 and associated with the hash key 302. The state information 332 includes, for example, current state, severity, trigger time, last update times, and occurrence time timestamps. The state information 332 is obtained from the state machine manager 214 applying the transitions rules 242 shown in FIG. 2. In the current example, the current state can be initial, preactive, active, inactive, expired or all done. The actual measurements 334 include measurements and possibly timestamps of the aggregated data that were originally provided by intercept devices, such as intercept devices 106 shown in FIG. 1. Examples of measurements include bit rate, service response time, packet loss, buffer fill, lag ratio, etc.

Figure 4B:
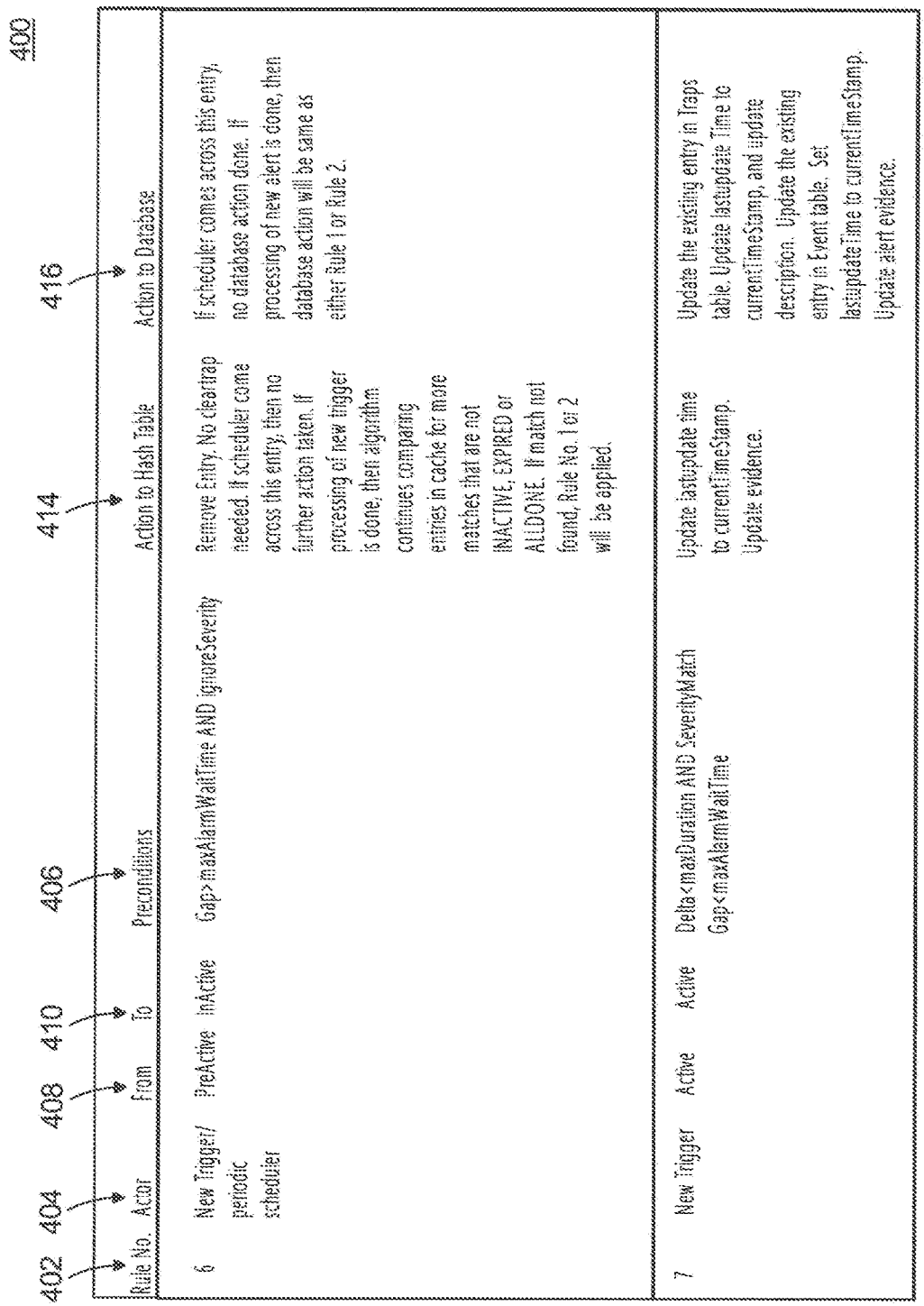

FIGS. 4A-4C show an example transition rules table 400 that describes application of the transition rules 242 by the transition module 250 identified by rule identifiers 402 (shown as Rules 1-12, in sequential order, in the current example), based on an actor 404 and precondition 406. The actor can be either a newly generated anomaly trigger or the periodic scheduler 252. The periodic scheduler 252 is described in more detail with reference to FIG. 6.

The spreadsheet 400 indicates for each rule as identified by its rule identifier 402 a current state 408 of a state machine being tracked, such as state machine 300 shown in FIG. 3), a new state 410 to which the state machine transitioned, an action to the hash table 230, and an action 416 to traps table 244 and event table 246 stored in long term memory or a database. The state machine transitions from the current state 408 to the new state 410, wherein the current state can be any of initial, preactive, active, inactive, or expired, and the new state can be any of preactive, active, inactive, expired or all-done.

The life cycle of the new alert starts with the initial state. A new state machine can then be generated that begins with a state of preactive or active, which can maintain its state or transition to states such as preactive, active, inactive, expired or all-done. Transition to the preactive state indicates that the alert occurred in one or more intervals, but in less than required by the poll interval rules in the alert profile parameters 330. Transition to the active state indicates that the alert occurred in one or more intervals and has met requirements of the poll interval rules. Transition to the inactive state indicates that there is a gap (wherein the gap is configurable) in occurrences of anomaly triggers associated with the alert, and the gap does not satisfy the timeout rules of the alert profile parameters 330. The gap is equal to the difference between a last update timestamp (before the current interval) and the trigger time. Transition to the expired state indicates that delta has exceeded a maximum duration established by the timeout rules. Delta is the difference between the current update time and the trigger time. Transition to the all-done state indicates that the life cycle of the alert has ended, such that the state machine is terminated and removed from the hash table 230, and associated entries in the traps table 244 are removed.

In operation, when the transition module 250 receives an anomaly trigger, it compares the key and severity of the anomaly sample for which the anomaly trigger was generated with the appropriate hash key 302 shown in FIG. 3 and severity (included in the state information 322 shown in FIG. 3) of the state machines stored in the hash table 230. The hash key of the state machine 300 can include a key obtained from the corresponding aggregated data and a metric type from an associated alert profile.

If a matching state machine is found in the hash table 230 that has a matching key, the transition module 250 determines the current state of the matching state machine, and uses the current state to determine the appropriate rule. In particular, the transition module 250 determines the appropriate transition rule to apply by identifying the first transition rule in the sequential order of rules that has a current state 408 that is the same state as the state of the matching state machine and the precondition is satisfied 406. The transition module 250 then implements the appropriate rule. Implementation of the appropriate rule, as described in greater detail below, includes, for example, selecting the next state; updating the hash table 230, traps table 244, event table 246 (e.g., updating trigger time, current time, next state, and/or updating or resetting evidence), and/or generating an alarm.

If a matching state machine is not found in the hash table 230, then a new state machine is added as an entry to the hash table 230, including adding the key data 302 and value data 304 to that state machine based on the aggregated sample for which the anomaly trigger was generated, and the event table 246 is updated. Implementation of the individual transition rules 242 once a matching state machine has been found in the hash table 230 is now explained. Rules 1-10 can be implemented in response to an anomaly trigger, whereas rules 6, 9, and 10-12 can be implemented in response to a request by the periodic scheduler 252.

Regarding Rule 1, in response to a new anomaly trigger, when the current state=initial, a determination is made whether the precondition (Delta=0 AND pollinterval >1 sample, ignoreSeverity) is met. Pollinterval is included in the timing constraints and establishes the number of consecutive intervals needed to transition to or remain in an active state. ignoreSeverity indicates that severity is not used when evaluating the precondition. In other words, the precondition is met if the state machine has been established during the current interval and the pollinterval established by the timing constraints requires more than one pollinterval before entering an active state. Thus, two or more consecutive anomaly triggers are needed to change the state from initial to active.

If the precondition is met, the state changes to preactive. In addition, the state of the new state machine that has just been added to the hash table 230 is updated with a preactive state. The event table 246 is updated with a new entry that corresponds to the state machine. Data stored in the event table entries can include, for example, trigger time, last update, timestamp, and alert evidence. Alert evidence can include, data for the state machine that is persisted in a database, such as last update, trigger time, state, actual measurement value, delta value (from threshold/baseline values), number of occurrences, and/or information about each time a cleartrap instruction was sent. Alert evidence can be updated each time an alert is generated. For example, when an alert is no longer active, the alert evidence can be updated with state information.

Regarding Rule 2, this rule is implemented if the precondition for Rule 1 was not met. In response to a new anomaly trigger, when the current state=initial, a determination is made whether the precondition (Delta=0 AND pollinterval=1 sample, ignoreSeverity) is met. In other words, the precondition is met if the state machine has been established during the current interval and the pollinterval established by the timing constraints requires only one pollinterval before entering an active state. Thus, only one anomaly trigger is needed to change the state from initial to active. The amount is based on the value of pollinterval which is user set for the type of key. It can be one instance. If the precondition is met, the state changes to active. In addition, the state of the new state machine that has just been added to the hash table 230 is updated with an active state. The event table 246 is updated with a new entry that corresponds to the state machine. Data stored in the event table entries can include, for example, trigger time, last update, timestamp, and alert evidence In addition, a new alarm is generated by notifying the user interface module 216 to and output an alarm. Furthermore, a new entry as added in the traps table 244 that represents the newly generated alarm. Once an alarm is generated, it remains until the alarm is timed out and becomes inactive, after which it is cleared and the state is changed to alldone at Rule 12.

Regarding Rule 3, in response to a new anomaly trigger, when the current state=preactive, a determination is made whether the precondition (Delta<pollinterval, ignoreSeverity) is met. In other words, the precondition is met if the pollinterval for transitioning to an active state has not been met yet. If the precondition is met, the state remains preactive. In addition, corresponding state machine in the hash table 230 is updated by updating the last update time to the current timestamp. The event table 246 is updated by setting the last update time to the current timestamp. Additionally, alert evidence in the event table 246 is updated.

Regarding Rule 4, this rule is implemented if the precondition for Rule 3 was not met. In response to a new anomaly trigger, when the current state=preactive, a determination is made whether the precondition (Gap>1 sample AND ignoreSeverity) is met. In other words, the precondition is met if there were not consecutive anomaly triggers, but there were some gaps in between, keeping the state machine in the preactive state while updating last update time and trigger time to current time stamp. If the precondition is met, the state remains preactive. In addition, the corresponding state machine in the hash table 230 is updated by updating the last update time and the trigger time to the current timestamp. The event table 246 is updated by setting the last update time and the trigger time to the current timestamp. Additionally, alert evidence in the event table 246 is updated.

Regarding Rule 5, this rule is implemented if the precondition for Rules 3 and 4 were not met. In response to a new anomaly trigger, when the current state=preactive, a determination is made whether the precondition (Delta>=pollInterval AND ignoreSeverity) is met. In other words, the precondition is met if there were consecutive anomaly triggers without gaps in between, allowing the state machine to enter the active state while updating last update time and trigger time to current time stamp. If the precondition is met, the state is updated to active. In addition, the corresponding state machine in the hash table 230 is updated by updating the last update time and the trigger time to the current timestamp. The event table 246 is updated by setting the last update time and the trigger time to the current timestamp. Additionally, alert evidence in the event table 246 is updated. Furthermore a new alarm is generated by notifying the user interface module 216 to and output an alarm. Furthermore, a new entry as added in the traps table 244 that represents the newly generated alarm.

Regarding Rule 6, this rule is implemented if the precondition for Rules 3-5 were not met. In response to a new anomaly trigger or a request from the periodic scheduler 252, when the current state=preactive, a determination is made whether the precondition (Gap>maxAlarmWaitTime AND ignoreSeverity) is met. In other words, the precondition is met if a gap occurred that exceeds a maximum alarm wait time established by the timing constraints. Accordingly, the periodic scheduler can clean out state machines that remain in the preactive state for too long. If the precondition is met, the state is updated to inactive. In addition, the corresponding state machine in the hash table 230 is updated by removing the corresponding state machine. A cleartrap operation is not needed. For each alert which transitions from an active state to an alldone state, a cleartrap request is generated. Performance of the cleartraps operation is stored in hash table 230 as well as in events table 246 as alert evidence.

If the actor 404 was the periodic scheduler 252, then no further action is taken to the hash table 230. If the actor 404 was a new anomaly trigger, a search is performed in the hash table 230 for additional matching state machines having states that are not inactive, expired or alldone. Criteria for finding a match include a matching index and precondition. If a match is not found, apply Rule 1 or Rule 2, depending which precondition is satisfied. If a match is found, the appropriate rule is applied. The event table 246 may be updated depending on the actor 404. If the actor 404 is the periodic scheduler 252, no action is taken to the event table 246. If the actor 404 is a new anomaly trigger, the event table 246 is updated in accordance with processing of a new alert is done, then database action will be same as either Rule 1 or Rule 2 Rule 1 or Rule 2, depending which precondition is satisfied.

Regarding Rule 7, in response to a new anomaly trigger, when the current state=active, a determination is made whether the precondition (Delta<maxDuration AND SeverityMatch AND Gap<maxAlarmWaitTime) is met. In other words, the anomaly trigger was within the interval defined by maxDuration of the previous anomaly trigger without significant gaps or wait time that violated the associated time constraints, and wherein the severity still matches. If the precondition is met, the state is maintained as active. In addition, the corresponding state machine in the hash table 230 is updated by updated by updating the last update time and the trigger time to the current timestamp. The event table 246 is updated by setting the last update time and the trigger time to the current timestamp. Additionally, alert evidence in the event table 246 is updated. Furthermore the last update time of the existing entry in the traps table 244 is updated to the current timestamp.

Regarding Rule 8, this rule is implemented if the precondition for Rule 7 was not met. In response to a new anomaly trigger, when the current state=active, a determination is made whether the precondition (Delta<maxDuration AND Gap<maxAlarmWaitTime) is met. In other words, the anomaly trigger was within the interval defined by maxDuration of the previous anomaly trigger for this state machine without significant gaps or wait time that violated the associated time constraints, however the severity did not match (since it failed the precondition of Rule 7). If the precondition is met, the state is maintained as active. In addition, a search is performed for additional existing state machines that satisfy the conditions of Rule 7 and that are have states that are not inactive, expired or alldone.

If no match is found, then a new state machine is added to the hash table 230 and the state of the new state machine is assigned to be active. If a new state machine was added to the hash table 230, the event table 246 is updated by adding a new entry. Furthermore a new alarm is generated by notifying the user interface module 216 to and output an alarm. Furthermore, a new entry as added in the traps table 244 that represents the newly generated alarm.

Regarding Rule 9, this rule is implemented if the precondition for Rules 7 and 8 were not met. In response to a new anomaly trigger or a request from the periodic scheduler 252, when the current state=active, a determination is made whether the precondition (Delta>maxDuration AND Gap<maxAlarmWaitTime) is met. In other words, the precondition is met if a gap had occurred that is below the maximum alarm wait time and the delta exceeds the maximum duration, wherein the maximum duration and the maximum alarm wait time are established by the timing constraints. If the precondition is met, the state is updated to expired. In addition, only if the actor was a new anomaly trigger, a state machine is added to the hash table 230 with its state assigned to be active. If the actor 404 was the periodic scheduler 252, then no action is taken to the hash table 230. The event table 246 may also be updated, depending on the actor 404. If the actor 404 is the periodic scheduler 252, no action is taken to the event table 246. If the actor 404 is a new anomaly trigger, a new entry is added to the event table 246. Furthermore a new alarm is generated by notifying the user interface module 216 to and output an alarm. In addition, only if the actor was a new anomaly trigger, a new entry is added in the traps table 244 that represents the newly generated alarm.

Regarding Rule 10, this rule is implemented if the precondition for Rules 7-9 were not met. In response to a new anomaly trigger or a request from the periodic scheduler 252, when the current state=active, a determination is made whether the precondition (Gap>=maxAlarmWaitTime) is met. In other words, the precondition is met if a gap occurred that exceeds the maximum alarm wait time. If the precondition is met, the state is updated to inactive. In addition, only if the actor was a new anomaly trigger, a state machine is added to the hash table 230 with its state assigned to be preactive or active (when the pollinterval is 1). If the actor 404 was the periodic scheduler 252, then no action is taken to the hash table 230. The event table 246 may also be updated, depending on the actor 404. If the actor 404 is the periodic scheduler 252, no action is taken to the event table 246. If the actor 404 is a new anomaly trigger, a new entry is added to the event table 246.

Regarding Rule 11, in response to a request from the periodic scheduler 252, when the current state=expired, a determination is made whether the precondition (purging thread scheduled) is met. In other words, Rule 11 is implemented only when a purging thread operation is scheduled by the purging scheduler 254. The purging scheduler 254 can schedule purging operations at regular intervals or in response to an event or condition. If the precondition is met, the state changes to alldone. In addition, a cleartrap operation is performed to the hash table, if needed. The state of the existing entry in the event table 246 is updated to alldone, and a cleartrap request is sent, informing the user that the alert is no longer active, since the cleartrap request is only sent for alerts that have been active. Additionally, alert evidence in the event table 246 is updated. In this case, the alert evidence includes state information.

Regarding Rule 12, in response to a request from the periodic scheduler 252, when the current state=inactive, a determination is made whether the precondition (purging thread scheduled) is met. In other words, Rule 12 is implemented only when a purging thread operation is scheduled by the purging scheduler 254, which can be at regular intervals or in response to an event or condition. If the precondition is met, the state changes to alldone. In addition, a cleartrap operation is performed to the hash table, if needed. The state of the existing entry in the event table 246 is updated to alldone, and a cleartrap request is sent, informing the user that the alert is no longer active, since the cleartrap request is only sent for alerts that have been active. Additionally, alert evidence (e.g., state information) in the event table 246 is updated.

Figure 5:
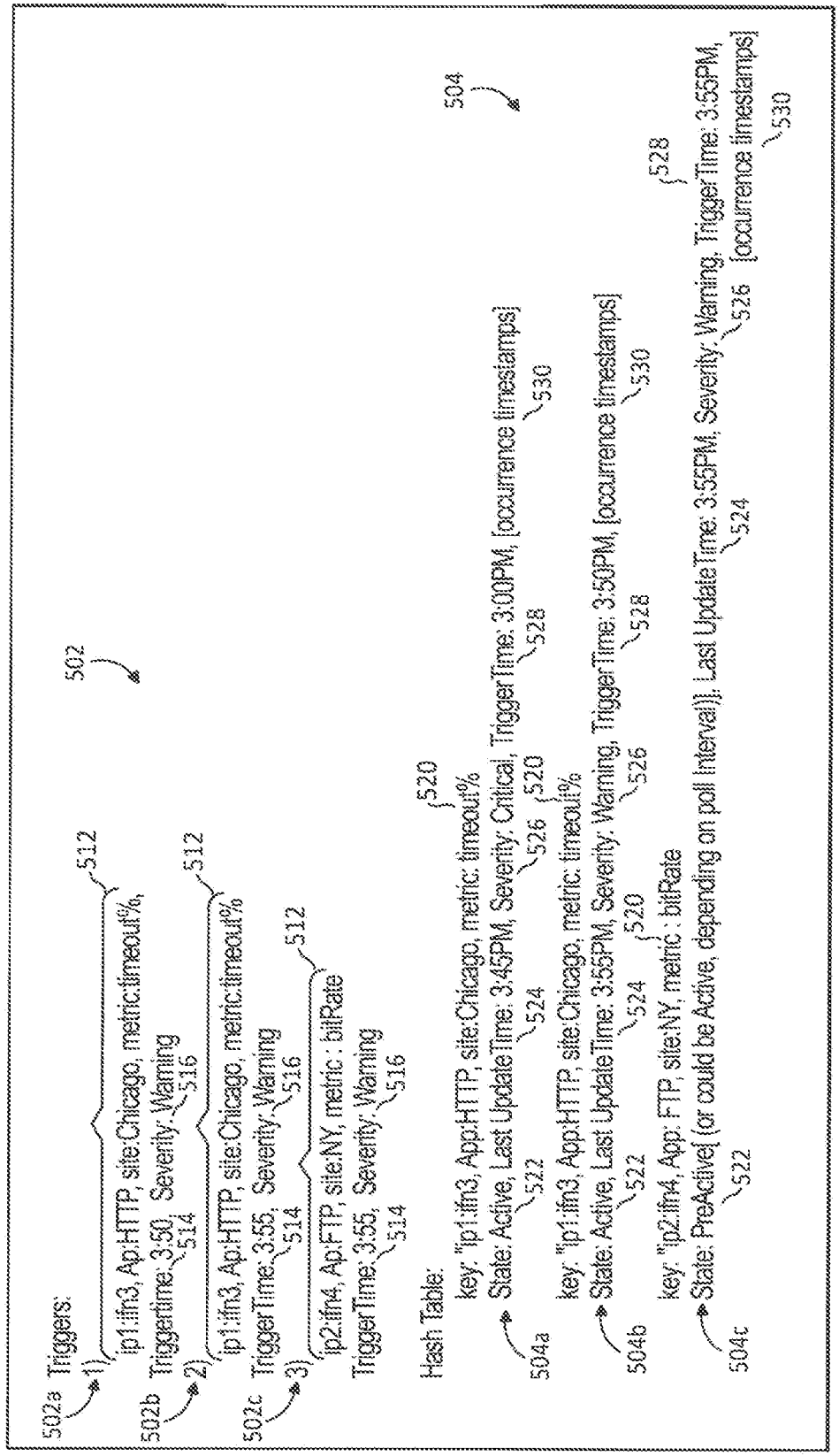
FIG. 5 illustrates a set of example anomaly triggers and associated example state machines established in accordance with an illustrative embodiment of the present disclosure.

FIG. 5 shows an example set 500 of anomaly triggers 502a, 502b, and 502c (referred to collectively as anomaly triggers 502) and hash table entries functioning as state machines 504a, 504b, and 504c (referred to collectively as state machines 504). Each anomaly trigger 502 has a key 512 assigned to the aggregated intercept data associated with the anomaly trigger (including identification of, e.g., an interface, site, application, and metric type) upon which anomalies are detected; trigger time 514 (which, in the current example, is timestamp of the associated aggregated intercept data); and severity 516.

Each state machine 504 includes a key 520, a state 522, a last update time 524, a severity 526, a trigger time 528, and occurrence timestamps 530. The occurrence timestamps 530 can include timestamps of all updates associated with anomaly triggers that were received. State machine 504a, having a trigger time 528 of 3:00 PM was established before the occurrence of anomaly triggers 502a-c, which have an earliest trigger time of 3:50. When anomaly trigger 502a was processed, it was compared to state machine 504a having a state 522=active. Although the key 512 of anomaly trigger 502a was determined to match the key 520 of state machine 504a, the severity 516 (=warning) of anomaly trigger 502a did not match the severity 526 (=critical) of state machine 504a. Accordingly, based upon Rule 8 of the transition rules 242, a new state machine 504b was established with the state 522=active, having a trigger time 528=3:50 PM, based on the trigger time of anomaly trigger 502a. Additionally, the last update time 524 of state machine 504b was set to 3:50 PM, but was then updated to 3:55 PM upon receipt of anomaly trigger 502b. Anomaly trigger 502b was used to update state machine 504b based on Rule 7, because both its key 512 and severity 516 matched the key 520 and severity 526 of state machine 504b.

Upon receipt of anomaly trigger 502c, there were no state machines that had a key 520 that matched the key 512 of any of the existing state machines. Therefore a new state machine 504c was established under Rules 1 or 2, depending on the value to which pollinterval was set. The state machine is assigned the following values: the key 520 of 504c is assigned to have the same value as key 512 of anomaly trigger 502c; the state 522 is assigned to be preactive or active, depending on the setting of the pollinterval; the last update time and the trigger time are both set to be 3:55 PM, which is the trigger time 514 of anomaly trigger 504c.

Figure 6:
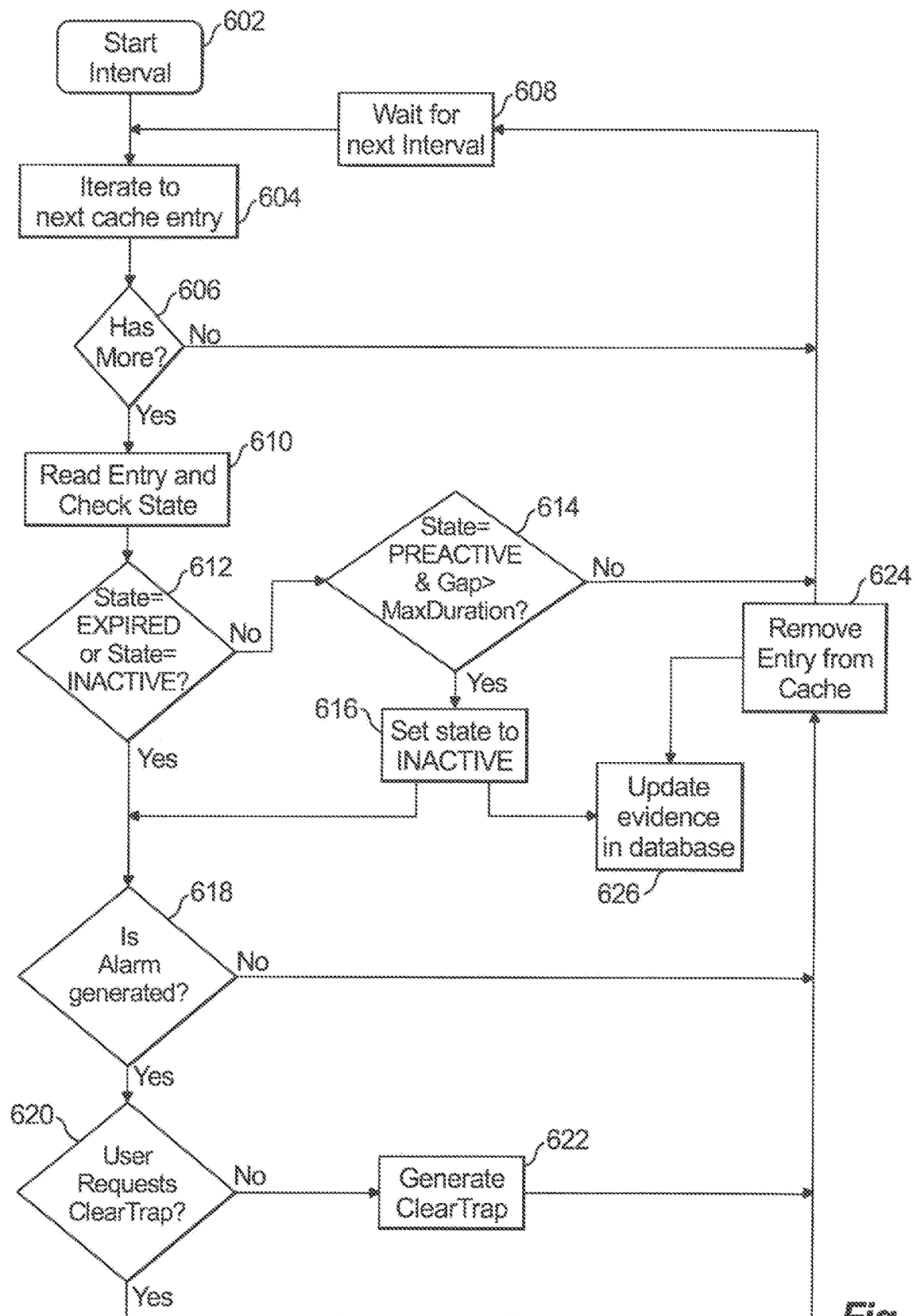
FIG. 6 illustrates a flowchart showing an example method performed by the analysis system in accordance with embodiments of the disclosure.

With reference now to FIG. 6, shown is a flowchart demonstrating implementation of the various exemplary embodiments. It is noted that the order of operations shown in FIG. 6 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 6, shows a method for performed by a periodic scheduler, such as periodic scheduler 252 shown in FIG. 2 At operation 602, an interval begins, At operation 604, a hash table including a plurality of state machine entries, such as hash table 230 shown in FIG. 2 is consulted and iterated through by accessing a next state machine in the hash table. During the first iteration, the first state machine is accessed. At operation 606, a determination is made whether there are no more state machines in the hash table to be accessed. If the determination at operation 606 is NO, meaning that there were no more state machines in the hash table to access at operation 604, then at operation 608 a wait operation is performed, which includes waiting for the beginning of a next interval. If the determination at operation 606 is YES, meaning a next state machine was successfully accessed at operation 604, then at operation 610 the state machine is consulted and the state of the state machine is determined.

At operation 612, a determination is made whether the state is expired or inactive. If the determination at operation 612 is NO, then at operation 614 a determination is made whether the state is preactive and a gap has occurred that exceeds a predetermined maximum duration. If the determination at operation 614 is NO, then the method continues at 604 in which a next state machine in the hash table is selected and accessed.

If the determination at operation 612 is YES, meaning the state of the currently accessed state machine is expired or inactive, the method continues at operation 618. If the determination at operation 614 is YES, meaning the state of the currently accessed state machine is preactive and a gap has occurred that exceeds the maximum determination, then at operation 616 the state is set to inactive and the method continues at operation 618. In addition, operation 626 is performed in which evidence is updated in a table that stores evidence, such as event table 246 shown in FIG. 2.

At operation 618 a determination is made whether an alarm had been generated previously when the state machine's state was active. If the determination at operation 618 is YES, then at operation 620 a determination is made whether a user has requested receiving a clear traps indication, such as clearing traps in traps table 244, shown in FIG. 2, that corresponds to the alarm. If the determination at operation 620 is NO, then operation 622 is performed, at which a cleartrap operation is performed to clear the alarm that corresponds to the state machine from the traps table. If the determination at operation 618 is NO or the determination at operation 620 is YES, then the method continues at operation 624. At operation 624 the state machine is removed from the hash table, and at operation 626 evidence is updated in the table that stores evidence. Additionally, the method then continues at operation 604 in which the next state machine in the hash table is selected and accessed.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the analysis system 112 may be implemented or executed by one or more computer systems. For example, analysis system 112 can be implemented using a computer system such as example computer system 702 illustrated in FIG. 7. In various embodiments, computer system 702 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 702 is only one example of a suitable system and is not intended to suggest any limitation as to the scope of use or functionality of embodiments of the disclosure described herein. Regardless, computer system 702 is capable of being implemented and/or performing any of the functionality set forth hereinabove.

Computer system 702 may be described in the general context of computer system-executable instructions, such as program modules, being executed by a computer system. Generally, program modules may include routines, programs, objects, components, logic, data structures, and so on that perform particular tasks or implement particular abstract data types. Computer system 702 may be practiced in distributed data processing environments where tasks are performed by remote processing devices that are linked through a communications network. In a distributed data processing environment, program modules may be located in both local and remote computer system storage media including memory storage devices.

Figure 7:
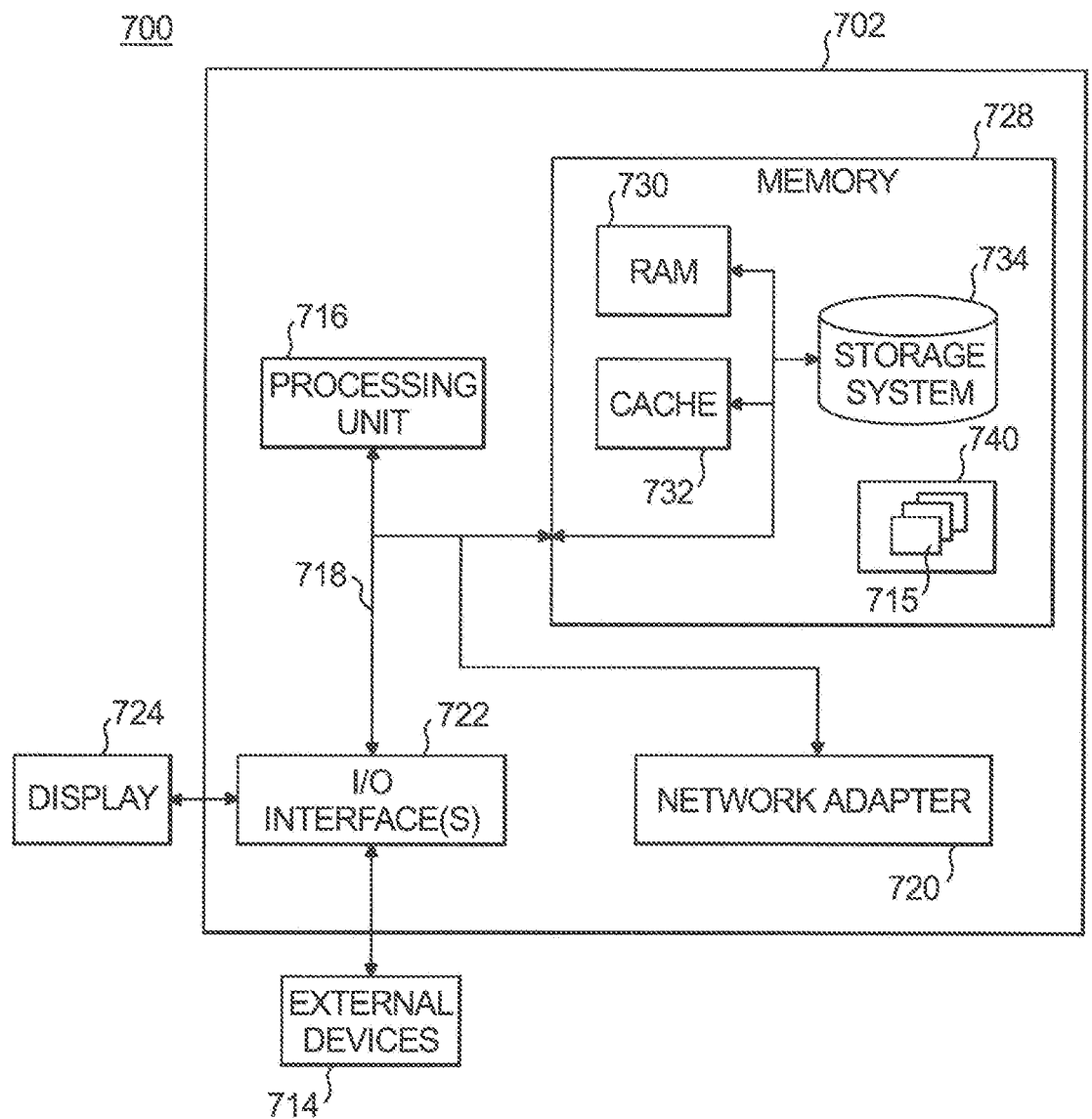
FIG. 7 illustrates a schematic block diagram of an example analysis system, in accordance with an illustrative embodiment of the present disclosure.

Computer system 702 is shown in FIG. 7 in the form of a general-purpose computing device. The components of computer system 702 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 702 typically includes a variety of computer system readable media. Such media may be any available media that is accessible by the analysis system 112, and it includes both volatile and non-volatile media, removable and non-removable media.

System memory 728 can include computer system readable media in the form of volatile memory, such as random access memory (RAM) 730 and/or cache memory 732. Computer system 702 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the disclosure.

Program/utility 740, having a set (at least one) of program modules 715, such as the aggregation module 210, anomaly detection module 212, state machine manager 214, and user interface module 216, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the disclosure as described herein.

Computer system 702 may also communicate with one or more external devices 714 such as a keyboard, a pointing device, a display 724, etc.; one or more devices that enable a user to interact with computer system 702; and/or any devices (e.g., network card, modem, etc.) that enable the analysis system 112 to communicate with one or more other computing devices. Such communication can occur via Input/Output (I/O) interfaces 722. Still yet, computer system 702 can communicate with one or more networks such as a local area network (LAN), a general wide area network (WAN), and/or a public network (e.g., the Internet) via network adapter 720. As depicted, network adapter 720 communicates with the other components of the analysis system 112 via bus 718. It should be understood that although not shown, other hardware and/or software components could be used in conjunction with computer system 702. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method the ability to manage alert lifecycles, wherein the disclosed method can be scaled to manage alert lifecycles associated with large and small networks. The disclosed method is capable of tracking anomalies using state machines and transition rules to recognize a new alert associated with a detected anomaly, to determine whether a detected anomaly warrants tracking an alert, to determine whether the alert has occurred for a sufficient number of poll cycles to warrant generation of an alarm, to track the anomalies using a state machine, to persist states of the state machine to long term storage, and/or to determine whether the alert needs to be cleared due to insufficient anomaly triggers, gaps in anomaly triggers, or exceeding a maximum duration. Advantageously, memory space for a state machine tracking an alert is only occupied while the alert is being tracked.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method for managing alerts comprising:
   intercepting network traffic utilizing network monitors for subsequent analysis of the intercepted network traffic;
   interfacing with the network monitors;
   receiving anomaly triggers generated as a function of detection of anomalies in the intercepted and analyzed network traffic;
   associating an anomaly trigger of the received anomaly triggers with an alert;
   establishing a state machine in response to receiving an anomaly trigger in accordance with a determination that a state machine matching the anomaly trigger is not yet established;
   tracking the alert using the state machine, wherein the state machine is established by creating an entry in a hash table;
   determining whether to change a state of the state machine if a subsequent anomaly trigger associated with the alert is received or if a predetermined amount of time passes without receiving trigger information;
   changing the state of the state machine from an initial state when the anomaly trigger was received to a preactive state or remaining in the preactive state when preactive state conditions are met, the preactive state conditions including the state machine being established during a current interval and passage of a predefined number of intervals is required before entering an active state, or the anomaly trigger includes one or more non-consecutive anomaly triggers, wherein one or more gaps between the non-consecutive anomaly triggers do not exceed a predetermined maximum alarm wait time;
   changing the state of the state machine from the initial or preactive state to an active state when newly active state conditions are met, the newly active state conditions including the state machine being established during the current interval and passage of a predefined number of intervals is required before entering an active state, or the anomaly trigger includes two or more consecutive anomaly triggers;
   keeping the state of the state machine in the active state when remain in active state conditions are met, the remain in active state conditions including a number of intervals the state machine remains in the active state does not exceed a predetermined maximum duration, and a number of intervals the state machine remains in the active state while not receiving any subsequent associated anomaly triggers does not exceed a predetermined maximum wait time; and
   generating an alarm based on the state of the state machine.

2. The computer-implemented method of claim 1, wherein the method further comprises allocating storage space for the state machine in a memory in response to receiving the anomaly trigger associated with the alert.

3. The computer-implemented method of claim 1, wherein the method further comprises storing a last state of the state machine in long term storage.

4. The computer-implemented method of claim 1, wherein the respective subsequent anomaly triggers are associated with the alert when a key and metric type of the respective subsequent and additional anomaly trigger matches a key and metric type of the anomaly trigger in response to which the state machine was established, the key including identification of at least one of an interface, a site, an application, virtual local area network, and access point name used when the anomalies were detected, wherein the method further comprises:
establishing, when a determination is made that the severity characteristic of one of the subsequent anomaly triggers received once the state of the state machine is active do not match the severity characteristic of the anomaly trigger, a second state machine in an active state;
tracking the state machine and the second state machine; and
generating the alarm based on the state of the state machine or the state of the second state machine.

5. The computer-implemented method of claim 1, wherein the method further comprises:
generating the alarm in response to at least one of the state of the state machine changing from the initial state to the active state and the state of the state machine changing from the preactive state to the active state;
establishing a second state machine associated with the alert and generating a new alarm in response to a determination that there was a change in the severity characteristic of anomaly triggers received once the state of the state machine is active; and
establishing a second state machine associated with the alert in response to a determination that the maximum duration time for the state machine remaining in the active state was exceeded.

6. The computer-implemented method of claim 1, wherein when the number of intervals the state machine remains in the active state exceeds the predetermined maximum duration, and the number of intervals the state machine remains in the active state while not receiving any subsequent associated anomaly triggers exceeds the predetermined maximum wait time, the state machine is removed from a storage storing the state machine.

7. The computer-implemented method of claim 1, wherein the predetermined severity characteristic is a threshold alert condition or a baseline alert condition that is based on a history of received trigger information.

8. The computer-implemented method of claim 1, wherein at least one parameter of logical rules applied to the state machine are user configurable, the parameters of the logical rules including a number of intervals after which the state machine changes states, a maximum time the state machine can remain in a state, and a maximum time between anomaly triggers for remaining in a preactive state or changing to or remaining in an active state.

9. The computer-implemented method of claim 1, wherein the method further comprises:
associating the anomaly triggers with respective alerts;
establishing different state machines for the respective alerts;
tracking the respective alerts using the different state machines; and
generating an alarm based on the state of each of the respective state machines.

10. The computer-implemented method of claim 1, wherein it is determined that a state machine matching the anomaly trigger is not yet established when a key and metric type of the anomaly trigger does not match a key and metric type of already established state machines, the key including identification of at least one of an interface, a site, an application, virtual local area network, and access point name associated with intercepted network traffic associated with the anomaly trigger.

11. The computer-implemented method of claim 10, wherein it is further determined that a state machine matching the anomaly trigger is not yet established when the anomaly trigger does match a key and metric type of one of the already established state machines, but a severity characteristic associated with the anomaly trigger does not match a severity characteristic associated with the already established state machine.

12. The computer-implemented method of claim 1, further comprising coupling to a source of the intercepted network traffic.

13. An analysis system for managing alerts comprising:
one or more network monitors for intercepting network traffic for subsequent analysis of the intercepted network traffic;
an interface for interfacing with the one or more network monitors;
a memory configured to store instructions;
a processor disposed in communication with the memory, wherein the processor upon execution of the instructions is configured to:
receive anomaly triggers generated as a function of detection of anomalies in the intercepted and analyzed network traffic;
associate an anomaly trigger of the received anomaly triggers with an alert;
establish a state machine in response to receiving an anomaly trigger in accordance with a determination that a state machine matching the anomaly trigger is not yet established, wherein the state machine is established by creating an entry in a hash table;
track the alert using the state machine;
determine whether to change a state of the state machine if a subsequent anomaly trigger associated with the alert is received or if a predetermined amount of time passes without receiving trigger information;
change the state of the state machine from an initial state when the anomaly trigger was received to a preactive state or remaining in the preactive state when preactive state conditions are met, the preactive state conditions including the state machine being established during a current interval and passage of a predefined number of intervals is required before entering an active state, or the anomaly trigger includes one or more non-consecutive anomaly triggers, wherein one or more gaps between the non-consecutive anomaly triggers do not exceed a predetermined maximum alarm wait time;
change the state of the state machine from the initial or preactive state to an active state when newly active state conditions are met, the newly active state conditions including the state machine being established during the current interval and passage of a predefined number of intervals is required before entering an active state, or the anomaly trigger includes two or more consecutive anomaly triggers;
keep the state of the state machine in the active state when remain in active state conditions are met, the remain in active state conditions including a number of intervals the state machine remains in the active state does not exceed a predetermined maximum duration, and a number of intervals the state machine remains in the active state while not receiving any subsequent associated anomaly triggers does not exceed a predetermined maximum wait time; and generate an alarm based on the state of the state machine.

14. The analysis system of claim 13, wherein the processor, upon execution of the instructions, is further configured to store a last state of the state machine in long term storage.

15. The analysis system of claim 13, wherein the respective subsequent anomaly triggers are associated with the alert when a key and metric type of the respective subsequent and additional anomaly trigger matches a key and metric type of the anomaly trigger in response to which the state machine was established, the key including identification of at least one of an interface, a site, an application, virtual local area network, and access point name used when the anomalies were detected, wherein the method further comprises:

establishing, when a determination is made that the severity characteristic of one of the anomaly triggers received once the state of the state machine is active do not match the severity characteristic of the anomaly trigger, a second state machine in an active state tracking the state machine and the second state machine; and generating the alarm based on the state of the state machine or the state of the second state machine.

16. The analysis system of claim 13, wherein the processor, upon execution of the instructions, is further configured to:

generate the alarm in response to at least one of the state of the state machine changing from the initial state to the active state and the state of the state machine changing from the preactive state to the active state;

establish a second state machine associated with the alert and generating a new alarm in response to a determination that there was a change in the severity characteristic of anomaly triggers received once the state of the state machine is active; and establish a second state machine associated with the alert in response to a determination that the maximum duration time for the state machine remaining in the active state was exceeded.

17. The analysis system of claim 13, wherein the processor, upon execution of the instructions, is further configured to:

associate the anomaly trigger a with respective alerts;
establish different state machines for the respective alerts;
track the respective alerts using the different state machine; and generate an alarm based on the state of each of the respective state machines.

18. A non-transitory computer readable storage medium and one or more computer programs stored therein, the computer programs comprising instructions, which when executed by a computer system, cause the computer system to:

intercept network traffic utilizing network monitors for subsequent analysis of the intercepted network traffic;

interface with the network monitors;

receive anomaly triggers generated as a function of detection of anomalies in the intercepted and analyzed network traffic;

associate an anomaly trigger of the received anomaly triggers with an alert;

establish a state machine in response to receiving an anomaly trigger in accordance with a determination that a state machine matching the anomaly trigger is not yet established, wherein the state machine is established by creating an entry in a hash table;

track the alert using the state machine;

determine whether to change a state of the state machine if a subsequent anomaly trigger associated with the alert is received or if a predetermined amount of time passes without receiving trigger information;

change the state of the state machine from an initial state when the anomaly trigger was received to a preactive state or remaining in the preactive state when preactive state conditions are met, the preactive state conditions including the state machine being established during a current interval and passage of a predefined number of intervals is required before entering an active state, or the anomaly trigger includes one or more non-consecutive anomaly triggers, wherein one or more gaps between the non-consecutive anomaly triggers do not exceed a predetermined maximum alarm wait time;

change the state of the state machine from the initial or preactive state to an active state when newly active state conditions are met, the newly active state conditions including the state machine being established during the current interval and passage of a predefined number of intervals is required before entering an active state, or the anomaly trigger includes two or more consecutive anomaly triggers;

keep the state of the state machine in the active state when remain active state conditions are met, the remain active state conditions including a number of intervals the state machine remains in the active state does not exceed a predetermined maximum duration, and a number of intervals the state machine remains in the active state while not receiving any subsequent associated anomaly triggers does not exceed a predetermined maximum wait time; and generate an alarm based on the state of the state machine.

* * * * *